United States Patent [19]
Cheng

[11] Patent Number: 5,494,340
[45] Date of Patent: Feb. 27, 1996

[54] WHEEL-MOUNTING ASSEMBLY FOR A HANDCART

[76] Inventor: Chin-Chang Cheng, No. 20, Lane 327, Sec. 2, Chung Shan Rd., Chung Ho City, Taipei Hsien, Taiwan

[21] Appl. No.: 289,943

[22] Filed: Aug. 12, 1994

[51] Int. Cl.$^6$ ..................................... B60B 37/00
[52] U.S. Cl. ........................ 301/111; 301/119; 301/121
[58] Field of Search ................................. 301/111, 118, 301/119, 120, 121, 113, 122; 403/83, 91, 92, 93, 109, DIG. 4

[56] References Cited

U.S. PATENT DOCUMENTS

| | | | |
|---|---|---|---|
| 282,539 | 8/1883 | Lincoln | 301/121 |
| 937,171 | 10/1909 | Patten | 301/121 |
| 938,220 | 10/1909 | Cupstid | 301/121 |
| 970,646 | 9/1910 | Roxberg | 301/119 |
| 982,413 | 1/1911 | Davis | 301/119 |
| 5,314,241 | 5/1994 | Cheng | 301/111 |

FOREIGN PATENT DOCUMENTS 707183  4/1954  United Kingdom .................. 301/120

Primary Examiner—Russell D. Stormer
Attorney, Agent, or Firm—Peterson, Wicks, Nemer & Kamrath

[57] ABSTRACT

A handcart wheel-mounting assembly includes a mount member which has a first tubular portion, a pair of first lug portions formed on an outer periphery of the first tubular portion and each having a slot defined therein, a first socket vertically defined in each of the first lug portions and communicating with associated slot, a second tubular portion co-axially formed in the wheel and having a tubular compartment defined therein for receiving the first tubular portion, a pair of second lug portions formed on an outer periphery of the second tubular portion each having a substantially U-shaped recess defined therein and communicating with the compartment for receiving a corresponding one of the pair of first lug portions, a second socket vertically defined in each of the pair of second lug portions and communicating with associated recess for alignment with associated first socket, and a resilient member received in the slot of each of the pair of first lug portions and having a latch formed thereon which is biased through the first socket into the second socket and projecting outwards of associated the second lug portion, a substantially L-shaped pressing element extending from the resilient member and having a horizontal section located above associated second lug portion.

4 Claims, 3 Drawing Sheets

5,494,340

WHEEL-MOUNTING ASSEMBLY FOR A HANDCART

BACKGROUND OF THE INVENTION

1. Field of Invention

The present invention relates to a wheel-mounting assembly, and more particularly to a wheel-mounting assembly for a handcart.

2. Related Prior Art

The closest prior art of a wheel-mounting assembly for a handcart is disclosed in the Applicant's own U.S. Pat. No. 5,314,241, filed Aug. 20, 1993. However, by such an arrangement, the latches 31 have to be biased downwardly by means an elongated and slender article when dismantled in order to detach the wheel 10 from the tubular hub member 20, so incurring difficulties in disassembling the wheel 10. In addition, the wheel 10 and the hub member 20 are both of circular configurations and are fastened together primarily by means of a plurality of latches 31, so easily causing a relative rotation between the wheel 10 and the hub member 20. Further, each of the holes 21 in the hub member 20 has to align with a corresponding socket 111 in the wheel 10 for the latch 31 to bias through a corresponding hole 21 and socket 111 so as to mount the wheel 10 on the hub member 20, so incurring inconvenience in assembling the wheel 10.

The present invention has arisen to mitigate and/or obviate the above-mentioned disadvantages of the conventional handcart wheel-mounting assembly.

SUMMARY OF THE INVENTION

The primary objective of the present invention is to provide a handcart wheel-mounting assembly which is easy to be assembled and dismantled by means of simply biasing against a pressing element.

Another objective is to provide first and second tubular portions aligning and matching with each other such that a wheel is easily mounted on a mount member.

A further objective is to provide a pair of bearings mounted in two ends of the mount member so as to reduce friction exerted on the wheel when rotating, thereby improving operation of the wheel.

In accordance with one aspect of the present invention, there is provided a wheel-mounting assembly for a handcart which comprises a wheel, a vertical supporting post having a hole transversely defined through a lower end thereof, and a wheel shaft having a distal end inserted through the hole of the supporting post, the wheel mounting assembly comprising a mount member which is mounted in the wheel and includes a first tubular portion having a longitudinal bore co-axially defined therethrough, a pair of rectangular first lug portions formed on an outer periphery of the first tubular portion and each having a slot defined therein, a first socket vertically defined in each of the first lug portions and communicating with associated slot, the distal end of the wheel shaft extending through the bore of the mount member and securely fitted in a cap-such that the mount member is firmly mounted on the wheel shaft, a second tubular portion co-axially formed in the wheel and having a tubular compartment defined therein for receiving the first tubular portion of the mount member, a pair of second lug portions formed on an outer periphery of the second tubular portion each having a substantially U-shaped recess defined therein and communicating with the compartment for receiving a corresponding one of the pair of first lug, portions, a second socket vertically defined in each of the pair of second lug portions and communicating with associated recess for alignment with associated first sockets of the first lug portion, and a resilient member received in the slot of each of the pair of first lug portions and having a latch formed thereon which is biased by means of the resilient member through the first socket into the second socket and projecting outwards of associated the second lug portion such that the wheel is able to be mounted on the mount member, a substantially L-shaped pressing element extending from the resilient member and having a horizontal section located above associated second lug portion such that when each of the pressing elements is pressed downwardly, thereby biasing the resilient member to detach the latch from associated first and second sockets, the wheel is able to be detached from the mount member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
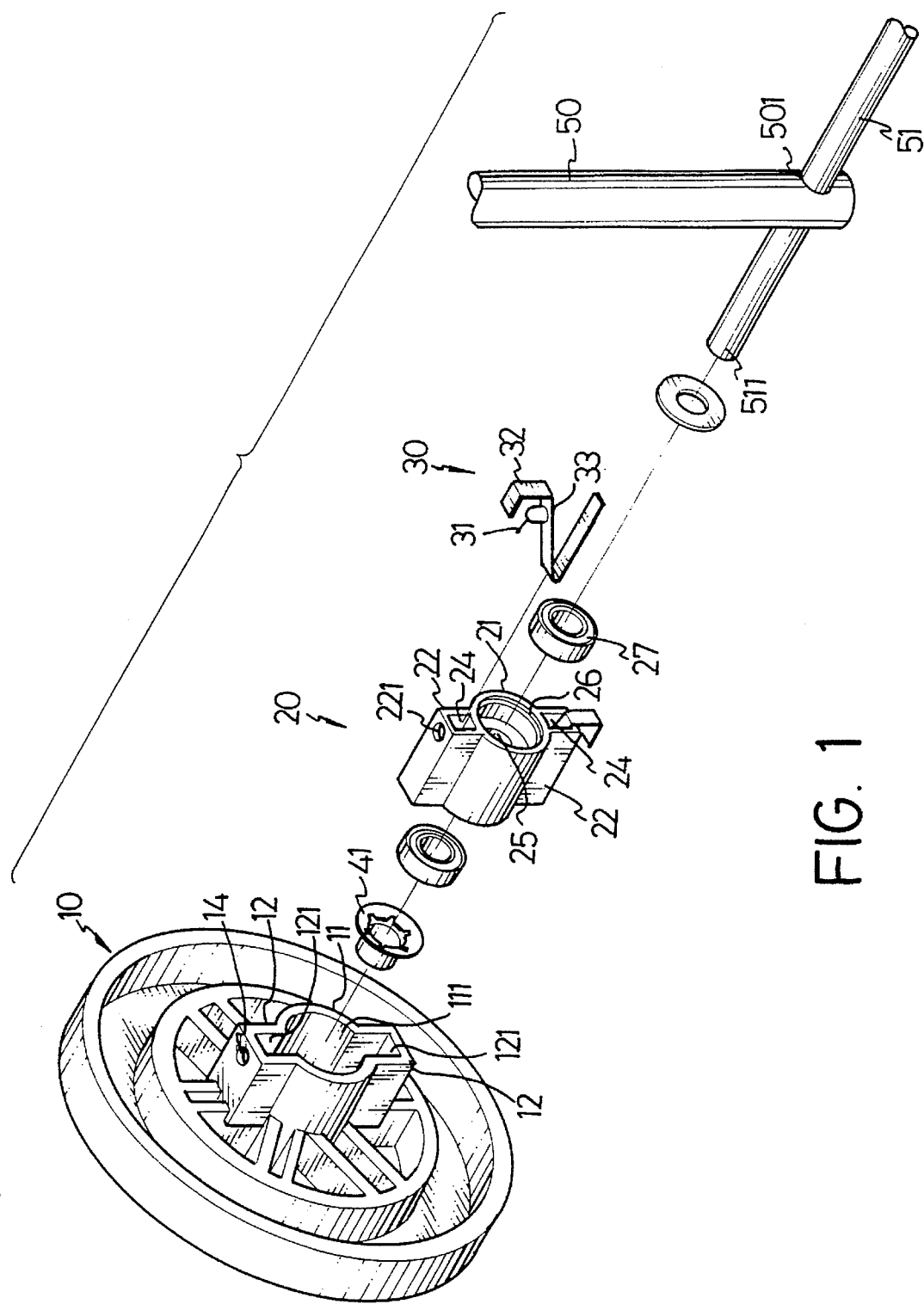
FIG. 1 is a perspective view of a handcart wheel-mounting assembly in accordance with the present invention.
Figure 2:
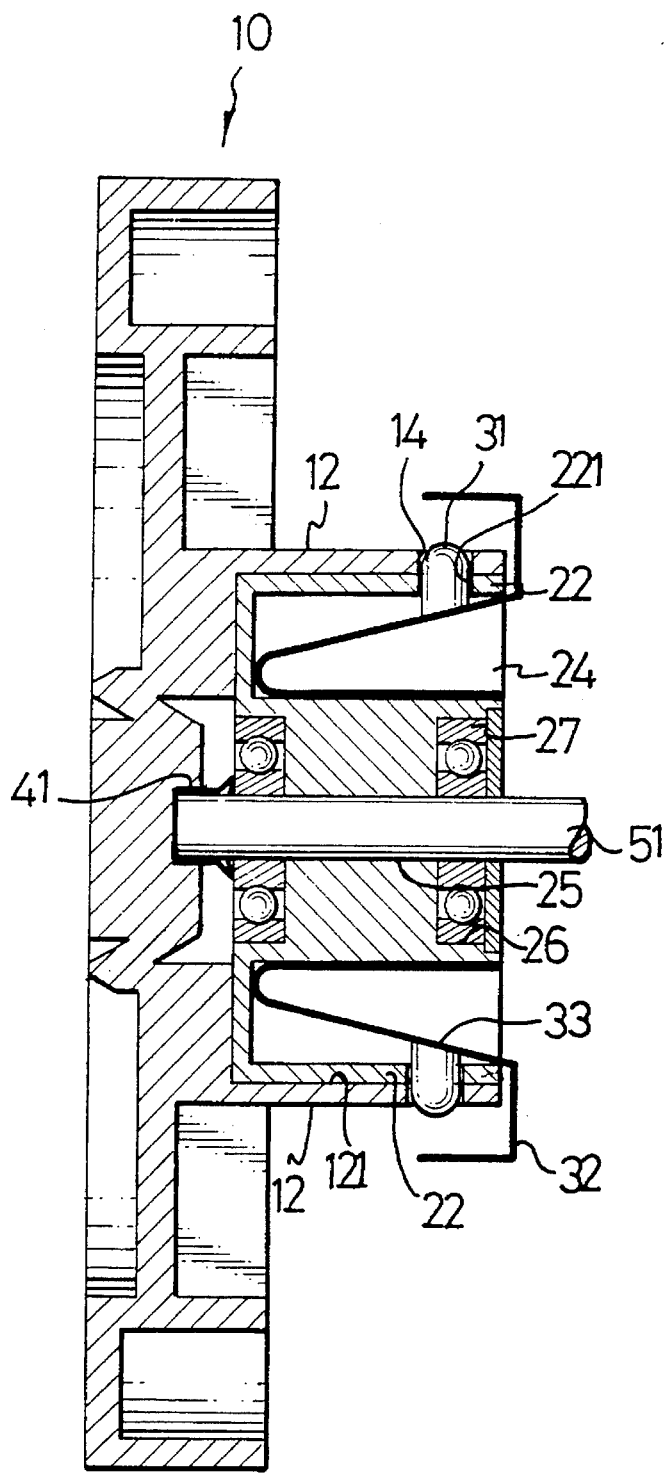
FIG. 2 is a side cross-sectional view of the handcart wheel-mounting assembly as shown in FIG. 1.

Referring to the drawings, and initially to FIGS. 1 and 2, a wheel-mounting assembly in accordance with the present invention is provided for a handcart which comprises a wheel 10, a vertical supporting post 50 having an hole 501 transversely defined through a lower end thereof, and a wheel shaft 51 having a distal end 511 inserted through the hole 501 of the supporting post 50, the wheel mounting assembly comprising a mount member 20 which is mounted in the wheel 10 and includes a first tubular portion 21 having a longitudinal bore 25 co-axially defined therethrough, a pair of rectangular first lug portions 22 diametrically oppositely formed on an outer periphery of the first tubular portion 21 and each having a slot 24 defined therein, a first socket 221 vertically defined in each of the first lug portions 22 and communicating with a corresponding slot 24. The first tubular portion 21 of the mount member 20 has a first end and a second end each defining a counterbore 26 therein which has a diameter greater than that of the bore 25 in the mount member 20 and a bearing 27 mounted in each of the counterbores 26. The distal end 511 of the wheel shaft 51 extends through the bore 25 and the pair of bearings 27 in the mount member 20 and is securely fitted in a cap 41 such that the mount member 20 is fixedly yet rotatably retained on the wheel shaft 51.

A second tubular portion 11 is co-axially formed in the wheel 10 and has a tubular compartment 111 defined therein for receiving the first tubular portion 21 of the mount member 20, a pair of second lug portions 12 formed on an outer periphery of the second tubular portion 11 each having a substantially U-shaped recess 121 defined therein and communicating with the compartment 11 for receiving a corresponding one of the pair of first lug portions 22, a second socket 14 vertically defined in each of the pair of second lug portions 12 and each communicating with one corresponding recess 121 for alignment with associated first sockets 221 of the first lug portion 22.

A substantially Z-shaped resilient member 30 is received in the slot 24 of each of the pair of first lug portions 22 and has a first section 33 and a second section with an angle therebetween, the second section is biased against a distal face of the first lug portion 22 and the first section 33 is biased against an outermost face defining the slot 24. A latch 31 protrudes from the first section 33 of the resilient member 30 and is biased by means of the resilient member 30 through the first socket 221 into the second socket 14 and projecting outwards of the corresponding second lug portion 12 such that the wheel 10 is able to be securely mounted on the mount member 20. Preferably, the latch 31 is integrally formed on the first section of the resilient member 30.

Figure 3:
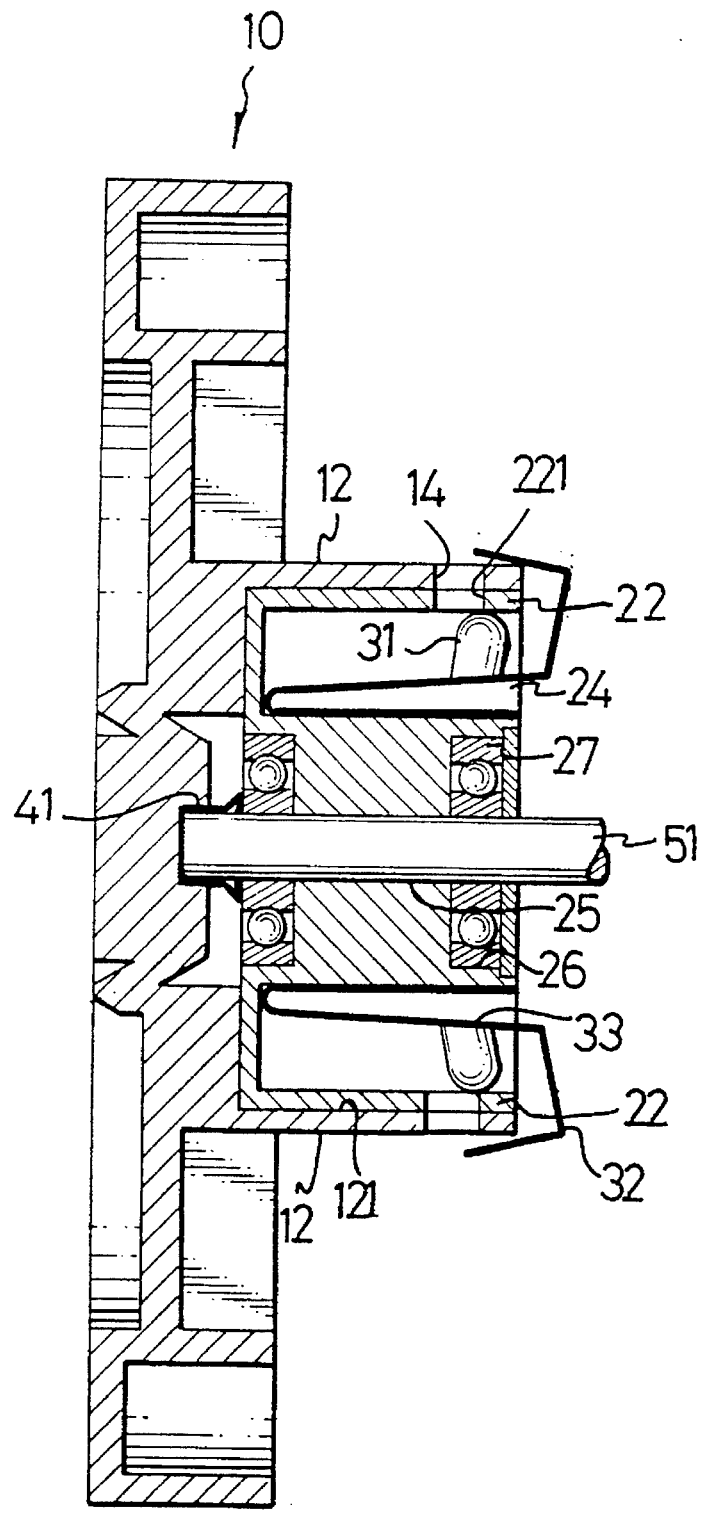
FIG. 3 is a side cross-sectional operation view of the handcart wheel-mounting assembly showing how the wheel detaches from the mount member.

Referring to FIGS. 2 and 3, a substantially L-shaped pressing element 32 extends from a distal end of the first section 33 of the resilient member 30 and has a horizontal section located above a corresponding second lug portion 12. By such an arrangement, when each of the pressing elements 32 is pressed downwardly, thereby biasing the first section 33 of the resilient member 30 to detach the latch 31 from the corresponding first and second sockets 221 and 14, the wheel 10 will easily detach from the mount member 20, thus being released from the handcart.

Accordingly, by such an arrangement, a handcart wheel-mounting assembly in accordance with the present invention has the following advantages and benefits:

(1) The wheel is easy to be assembled and dismantled by means of simply biasing against the pressing element.

(2) It is not easy to cause a relative rotation between the mount member and the wheel on account of fixation effect between the first lug portion of the mount member and the second lug portion of the wheel.

(3) The configurations of the first and second tubular portions align and match with each other such that the wheel is easily mounted on the mount member.

(4) The bearings mounted in two ends of the mount member are able to reduce friction exerted on the wheel when rotating, thereby improving operation of the wheel.

It should be clear to those skilled in the art that further embodiments of the present invention may be made without departing from the teachings of the present invention.

I claim:

1. A wheel-mounting assembly for a handcart which comprises a wheel (10), a vertical supporting post (50) having a hole (501) transversely defined through a lower end thereof, and a wheel shaft (501) having a distal end (511) inserted through said hole (501) of said supporting post (50), said wheel mounting assembly comprising:

a mount member (20) mounted in said wheel (10) and comprising a first tubular portion (21) having a longitudinal bore (25) co-axially defined therethrough, a pair of rectangular first lug portions (22) formed on an outer periphery of said first tubular portion (21) and each having a slot (24) defined therein, a first socket (221) vertically defined in each of said first lug portions (22) and communicating with associated said slot (24), said distal end (511) of said wheel shaft (51) extending through said bore (25) of said mount member (20) and securely fitted in a cap (41) such that said mount member (20) is firmly mounted on said wheel shaft (51);

a second tubular portion (11) co-axially formed in said wheel (10) and having a tubular compartment (111) defined therein for receiving said first tubular portion (21) of said mount member (20), a pair of second lug portions (12) formed on an outer periphery of said second tubular portion (11) each having a substantially U-shaped recess (121) defined therein and communicating with said compartment (111) for receiving a corresponding one of said pair of first lug portions (22), a second socket (14) vertically defined in each of said pair of second lug portions (12) and communicating with associated said recess (121) for alignment with associated said first sockets (221) of said first lug portion (22); and two resilient members (30) each received in said slot (24) of a corresponding one of said pair of first lug portions (22) and each having a latch (31) formed thereon which is biased by means of said resilient member (30) through associated said first socket (221) into associated said second socket (14) and projecting outwards of associated said second lug portion (12) such that said wheel (10) is able to be mounted on said mount member (20), two substantially L-shaped pressing elements (32) each extending from a corresponding one of said resilient members (30) and each having a horizontal section located outwards of associated said second lug portion (12) such that when each of said pressing elements (32) is pressed toward associated said second lug portion (12), thereby biasing said resilient member (30) to detach said latch (31) from associated said first and second sockets (221) and (14), said wheel (10) is able to be detached from said mount member (20).

2. The handcart wheel-mounting assembly in accordance with claim 1, wherein said resilient member (30) is substantially Z-shaped and has a first section (33) and a second section, said latch (31) protruding from said first section (33), said pressing element (32) extending from a distal end of said first section (33) and having said horizontal section thereof located above said latch (31).

3. The handcart wheel-mounting assembly in accordance with claim 1, wherein said pair of first lug portions (22) of said mount member (20) are diametrically opposite to each other.

4. The handcart wheel-mounting assembly in accordance with claim 1, wherein said first tubular portion (21) of said mount member (20) has a first end and a second end each defining a counterbore (26) therein which has a diameter greater than that of said bore (25) in said mount member (20), a bearing (27) mounted in each of said counterbores (26), said distal end (511) of said wheel shaft (51) extending through said bore (25) in said mount member (20) and said pair of bearings (27) and securely fitted in said cap (41).

* * * * *